United States Patent
Manclossi et al.

(10) Patent No.: US 10,663,617 B2
(45) Date of Patent: *May 26, 2020

(54) SYSTEMS AND METHODS FOR MONITORING RADIATION IN WELL LOGGING

(71) Applicant: Schlumberger Technology Corporation, Sugar Land, TX (US)

(72) Inventors: Mauro Manclossi, Paris (FR); Laurent Laval, Verrieres le Buisson (FR); Christian Stoller, Princeton Junction, NJ (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 17 days.

This patent is subject to a terminal disclaimer.

(21) Appl. No.: 15/393,805

(22) Filed: Dec. 29, 2016

(65) Prior Publication Data

US 2018/0188409 A1   Jul. 5, 2018

(51) Int. Cl.
*G01V 5/08* (2006.01)
*H01J 47/02* (2006.01)
(Continued)

(52) U.S. Cl.
CPC .............. *G01V 5/08* (2013.01); *G01T 1/2935* (2013.01); *G01T 3/008* (2013.01); *G01V 5/04* (2013.01); *H01J 47/026* (2013.01)

(58) Field of Classification Search
CPC .......... G01V 5/08; G01V 5/04; G01T 1/2935; G01T 3/008; H01J 47/026
See application file for complete search history.

(56) References Cited

U.S. PATENT DOCUMENTS 6,069,362 A * 5/2000 Giakos .................. G01T 1/2935
                                                                    250/324
7,507,952 B2   3/2009 Groves et al.
(Continued)

OTHER PUBLICATIONS

Imashuku, S. et al, "Development of a Palm-Size Electron Probe X-Ray Analyzer", JCPDS-International Centre for Diffraction Data (2012) ISSN 1097-0002, pp. 252-256.
(Continued)

*Primary Examiner* — David P Porta
*Assistant Examiner* — Jeremy S Valentiner
(74) *Attorney, Agent, or Firm* — Trevor G. Grove

(57) ABSTRACT

A downhole tool includes a radiation generator configured to output radiation using electrical power received from a power supply. A first portion of the radiation is emitted into a surrounding sub-surface formation. The downhole tool also includes a radiation detector coupled proximate the radiation generator. The radiation detector includes a micromesh gaseous detector, and the radiation detector is configured to output a measurement signal based at least in part on interaction between a second portion of the radiation output by the radiation generator and the radiation detector. Additionally, the downhole tool includes a control system communicatively coupled to the radiation generator and the radiation detector. The control system is configured to determine measured characteristics of the radiation output from the radiation generator based at least in part on the measurement signal and to control operation of the radiation generator based at least in part on the measured characteristics.

20 Claims, 5 Drawing Sheets

(51) Int. Cl.
  *G01V 5/04* (2006.01)
  *G01T 1/29* (2006.01)
  *G01T 3/00* (2006.01)

(56) References Cited

U.S. PATENT DOCUMENTS

| | | | |
|---|---|---|---|
| 7,542,543 B2 | 6/2009 | Shampine et al. | |
| 7,564,948 B2 | 7/2009 | Wraight et al. | |
| 7,639,781 B2 | 12/2009 | Shampine et al. | |
| 7,684,540 B2 | 3/2010 | Groves et al. | |
| 7,903,782 B2 | 3/2011 | Groves et al. | |
| 7,960,687 B1 * | 6/2011 | Simon | G01V 5/125 250/269.1 |
| 8,975,593 B1 * | 3/2015 | Best | G01T 3/008 250/391 |
| 10,295,700 B2 * | 5/2019 | Beekman | G01V 5/12 |
| 2004/0248314 A1 | 12/2004 | Stephenson et al. | |
| 2005/0269499 A1 | 12/2005 | Jones et al. | |
| 2007/0287190 A1 | 12/2007 | Chevalier et al. | |
| 2008/0302533 A1 | 12/2008 | Richard et al. | |
| 2010/0147349 A1 | 6/2010 | DiFoggio | |
| 2012/0087467 A1 | 4/2012 | Tjugum | |
| 2012/0138782 A1 | 6/2012 | Simon et al. | |
| 2013/0329859 A1 | 12/2013 | Groves et al. | |
| 2014/0060821 A1 | 3/2014 | Rodney et al. | |
| 2014/0117246 A1 * | 5/2014 | Zhou | G01T 1/185 250/375 |
| 2014/0208768 A1 | 7/2014 | Bacic | |
| 2015/0115992 A1 * | 4/2015 | Fushie | H01J 43/246 324/759.01 |
| 2015/0211350 A1 | 7/2015 | Norman et al. | |
| 2016/0274038 A1 | 9/2016 | Brady et al. | |
| 2016/0320520 A1 * | 11/2016 | Hiles | E21B 47/1015 |
| 2017/0169909 A1 | 6/2017 | Tkabladze | |
| 2018/0188412 A1 | 7/2018 | Beekman | |

OTHER PUBLICATIONS

Geuther, J.A. et al., "High-Energy X-ray Production With Pyroelectric Crystals," Journal of Applied Physics 97, (2005), 5 pp.
Geuther J., et al, "Electron Acceleration for X-Ray Production Using Paired Pyroelectric Crystals," Rensselaer Polytechnic Institute, pp. 591-595.
Fukao, S., et al, "X-rays Source Using Thermal Excitation of Pyroelectric Crystal for Medical Application", Progress In Electromagnetics Research Symposium Proceedings, Moscow, Russia, Aug. 18-21, 2009, pp. 807-815.
Gall, B., et al, "Investigation of the Piezoelectric Effect as a Means to Generate X-Rays," IEEE Transactions on Plasma Science, vol. 41, No. 1, Jan. 2013, pp. 106-111.
Gall, B.B. et al, "High Voltage Piezoelectric System for Generating Neutrons", Digest of Technical Papers—IEEE International Pulsed Power Conference [1-4673-5167-9] (2013).
Sarrazin, P., et al, "Carbon-Nanotube Field Emission X-Ray Tube for Space Exploration XRD/XRF Instrument", International Centre for Diffraction Data (2004 Advances in X-ray Analysis, vol. 47, pp. 232-239.
Fitzgerald, et al, "Continuous Gamma-ray Densitometry in a Borehole Flow Meter," IEEE Nuclear Science Symposium Conference, vol. 2 (2003) Article No. N26-64, pp. 732-736.
Webster, et al, "Multiphase Well Surveillance with a Permanent Downhole Flowmeter", SPE90024, (2204) Society of Petroleum Engineers, 8 pp.
Amptek X-ray Generator with Pyroelectric Crystal, http://www.amptek.com/pdf/coolx.pdf, accessed Sep. 13, 2016, 4 pp.
International Search Report and Written Opinion issued in the related PCT Application No. PCT/US2016/020399 dated Jun. 10, 2016, (15 pages).
International Preliminary Report on Patentability issued in the related PCT Application No. PCT/US2016/020399 dated Sep. 19, 2017 (13 pages).
G.Bertuccio and R.Casiraghi, "Study of Silicon Carbide for X-Ray Detection and Spectroscopy", IEEE Transactions on Nuclear Science, vol. 50, No. 1, Feb. 2003, (11 pages).
G.Bertuccio, D.Puglisi et al. "Silicon Carbide Detectors for in vivo Dosimetry", IEEE Transactions on Nuclear Science, vol. 61, No. 2, Apr. 2014 (6 pages).
J.Russel Terry et al., Evaluation of COTS Silicon Carbide Photodiodes for a Radiation-Hard, Low-Energy X-Ray Spectrometer, 2011 IEEE Nuclear Science Symposium Conference Record, (4 pages).
S.P.Lansley et al. "CVD Diamond X-ray Detectors for Radiotherapy Dosimetry", S.P.Lansley et al., IEEE Sensors 2009 Conference (6 pages).
D.M.Trucchi et al., "Very Fast and Primingless Single-Crystal-Diamond X-Ray Dosimeters", IEEE Electron Device Letters, vol. 33, No. 4, Apr. 2012 (3 pages).
Office Action issued in the related U.S. Appl. No. 15/393,793 dated Oct. 4, 2018 (18 pages).
Notice of Allowance issued in related case U.S. Appl. No. 14/663,158 dated Jul. 13, 2018 (9 pages).

* cited by examiner

SYSTEMS AND METHODS FOR MONITORING RADIATION IN WELL LOGGING

BACKGROUND

The present disclosure generally relates to well logging and, more particularly, to radiation detectors used in well logging.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Generally, an electrically operated radiation generator, such as an X-ray generator, a gamma ray generator, or a neutron generator, may generate radiation using electrical power on demand to facilitate determining characteristics of its surrounding environment. Thus, electrically operated radiation generators may be used in various contexts, such as a downhole tool or for material analysis in well logging. For example, in a downhole tool, an electrically operated radiation generator may facilitate determining properties such as porosity, density, and/or lithology of surrounding formations based at least in part on radiation count rates and/or radiation energy or time spectra detected in one or more radiation detectors in the downhole tool string.

To facilitate determining the characteristics, the electrically operated radiation generator may output high-energy radiation into its surrounding environment. Once output, the high-energy radiation may interact with atoms in the surroundings, for example, transferring energy to an atomic electron and/or causing the atomic nucleus to release one of its neutrons. In some instances, relationships between radiation output from the electrically operated radiation generator and radiation received from the surrounding environment may be indicative of characteristics of the surrounding environment.

Additionally, in some instances, characteristics of radiation output from an electrically operated radiation generator may be indicative of operation of the electrically operated radiation generator and, thus, used to control operation. However, in some instances, accurately determining characteristics of radiation output from an electrically operated radiation generator may be difficult, for example, due to space constraints, high temperatures, high radiation flux, and/or target resolution of radiation measurements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

One embodiment describes a downhole tool that includes a radiation generator configured to output radiation using electrical power received from a power supply. A first portion of the radiation is emitted from the downhole tool into a surrounding sub-surface formation. The downhole tool also includes a first radiation detector coupled proximate the radiation generator. The first radiation detector includes a micromesh gaseous detector, and the first radiation detector is configured to output a first measurement signal based at least in part on interaction between the first radiation detector and a second portion of the radiation output by the radiation generator. Additionally, the downhole tool includes a control system communicatively coupled to the radiation generator and the first radiation detector. The control system is configured to determine measured characteristics of the radiation output from the radiation generator based at least in part on the first measurement signal and control operation of the radiation generator based at least in part on the measured characteristics.

Another embodiment describes a method for operating a radiation generator in a downhole tool that includes generating, using a radiation generator in the downhole tool, radiation based at least in part on electrical power received from a power source. A first portion of the radiation is emitted from the downhole tool to a surrounding sub-surface formation. The method also includes outputting, using a micromesh gaseous detector, a first measurement signal indicative of interaction of a second portion of the radiation generated by the radiation generator and the micromesh gaseous detector. Additionally, the method includes determining, using a control system, a measured characteristic of the radiation generated by the radiation generator based at least in part on the first measurement signal. Furthermore, the method includes controlling, using the control system, operation of the radiation generator based at least in part on the measured characteristic of the radiation generated by the radiation generator.

Another embodiment describes A tangible, non-transitory, computer-readable medium that stores instructions executable by one or more processors of a control system to control operation of a downhole tool. The instructions include instructions to determine, using the one or more processors, operational parameters used by a radiation generator in the downhole tool to generate radiation. The instructions also include instructions to determine, using the one or more processors, target characteristics of the radiation to be emitted from the downhole tool to a surrounding sub-surface formation. Additionally, the instructions include instructions to receive, using the one or more processors, first sensor data indicated by electrical current output from a micromesh gaseous detector based at least in part on interaction between the micromesh gaseous detector and at least a portion of the radiation output from the radiation generator. Moreover, the instructions include instructions to determine, using the one or more processors, measured characteristics of the radiation based at least in part on the first sensor data. Furthermore, the instructions include instructions to instruct, using the one or more processors, the downhole tool to adjust the operational parameters used to operate the radiation generator based at least in part on the measure characteristics and the target characteristics of the radiation generated by the radiation generator.

BRIEF DESCRIPTION OF THE DRAWINGS

Various aspects of this disclosure may be better understood upon reading the following detailed description and upon reference to the drawings in which.

DETAILED DESCRIPTION

Figure 1:
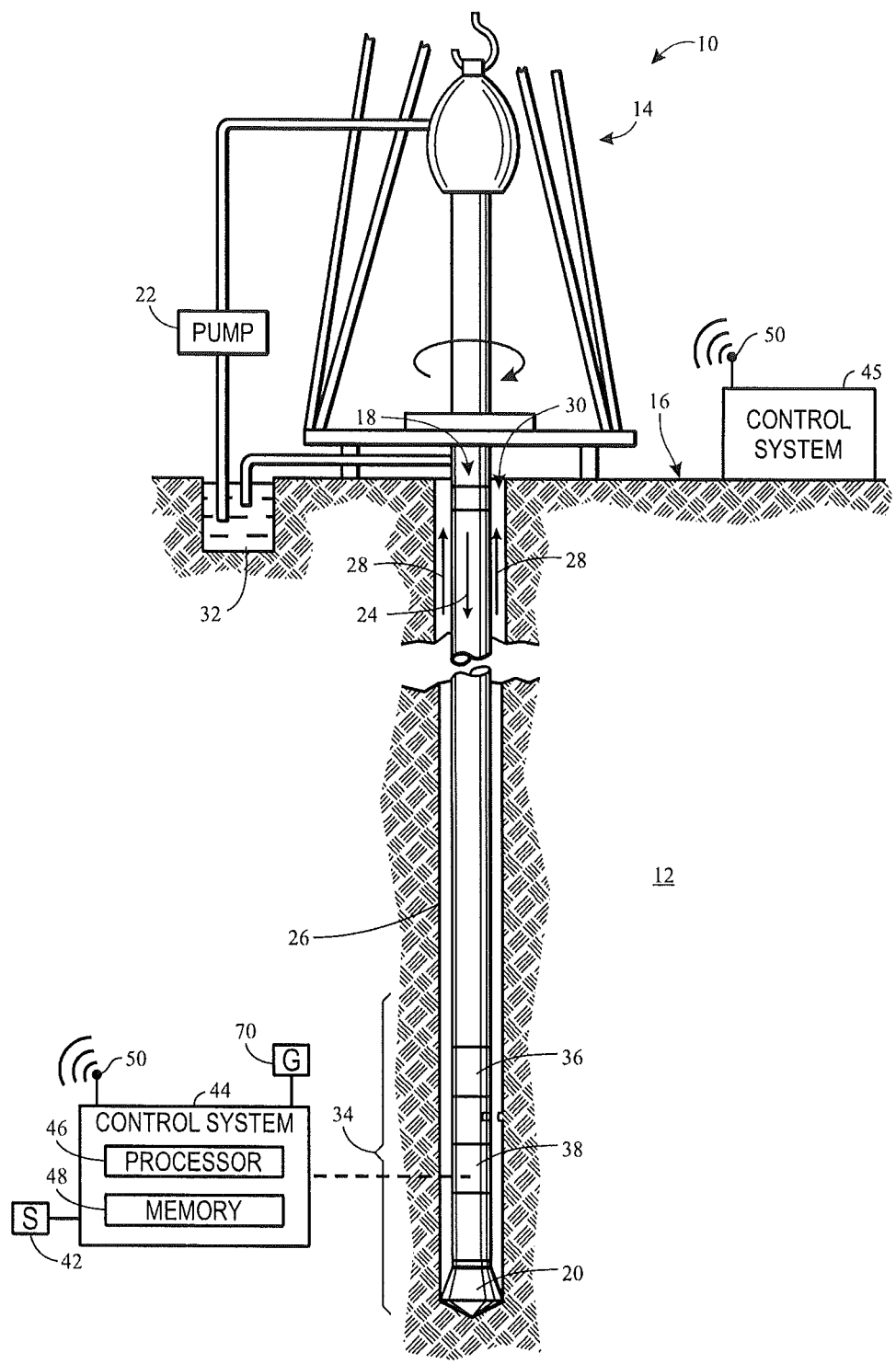
FIG. 1 is a schematic diagram of a drilling system including a downhole tool with a radiation generator, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electrically operated radiation generator may generate and output radiation to facilitate determining characteristics (e.g., porosity and/or mineralogy) of its surrounding environment. Depending on characteristics to determine, various types of electrically operated radiation generators may be used, such as an X-ray generator, a gamma ray generator, or a neutron generator. Generally, the different types of electrically operated radiation generators may output different types of radiation. For example, an X-ray generator may output X-ray radiation, a gamma ray generator may output gamma ray radiation, and a neutron generator may output neutron radiation.

Nevertheless, the different types of electrically operated radiation generators may be operationally similar. For example, electrical power may be supplied to accelerate a particle (e.g., ion or electron) toward a target. When the particle strikes atoms in the target, radiation may be generated and output. The radiation may then interact with atoms in the surrounding environment by scattering from the atoms (e.g., electrons and/or nuclei of the atoms) of the surrounding environment or by causing the atomic nuclei of the surrounding environment to output radiation (e.g., neutrons and/or gamma rays). A radiation detector (e.g., sensor) may then measure count (e.g., amount), count rate (e.g., amount per unit time) and/or other properties of the radiation returned from the surrounding environment. In this manner, characteristics of the surrounding environment, such as porosity and/or mineralogy, may be determined based at least in part on characteristics of radiation received from the surrounding environment and characteristics of radiation output to the surrounding environment. Additionally, in some instances, operation of the radiation generator may be controlled based at least in part on characteristics of output radiation.

However, in some instances, accurately determining characteristics of radiation output from an electrically operated radiation generator may be difficult. For example, unsteady temperatures (e.g., temperatures that vary with time) may result in a scintillation radiation detector losing a fraction of its light output if the temperature rises too high, in a change in gain of the detector device, and/or in the detector device outputting dark current that increases exponentially with temperature. Additionally, in some instances, a radiation detector may not be capable of collecting data quickly enough, providing desired energy resolution, and/or providing desired spatial resolution. Moreover, in some instances, space available to implement a radiation detector may be limited, for example, by size of a borehole and/or size of a downhole tool.

Accordingly, the present disclosure provides techniques to facilitate improving operation of a radiation generator (e.g., an X-ray generator and/or a neutron generator) by improving determination of radiation characteristics output from the radiation generator, for example, implemented in a downhole tool. In some embodiments, one or more micromesh gaseous detectors may be used facilitate monitor characteristics of radiation output from the radiation generator. To facilitate monitoring characteristics of output radiation, in some embodiments, a micromesh gaseous detector may be disposed adjacent the radiation generator. Additionally, compared to other types of radiation detectors, a micromesh gaseous detector may improve accuracy of sensor data indicative of radiation characteristics in high temperature environments, increase collection rate of the sensor data, and/or reduce space used to implement radiation detectors.

Based at least in part on collected sensor data, in some embodiments, a control (e.g., data processing) system may process and/or analyze the sensor data to determine radiation characteristics of the output from the radiation generator. Additionally, based at least in part on the radiation characteristics, the control system may control operation of the radiation generator, for example, by adjusting voltage of electrical power supplied to the radiation generator, temperature within the radiation generator, and/or pressure within the radiation generator. In this manner, the techniques described in the present disclosure facilitate improving determination of radiation characteristics output from a radiation generator, thereby improving operation of the radiation generator controlled based at least in part on the output radiation characteristics and, as a consequence, the accuracy of other (e.g., formation) characteristics determined based at least in part on the output radiation characteristics.

To help illustrate, a drilling system 10, which may be used to drill a well through subsurface formations 12, is shown in FIG. 1. In the depicted embodiment, a drilling rig 14 at the surface 16 may rotate a drill string 18, which includes a drill bit 20 at its lower end to engage the subsurface formations 12. To cool and/or lubricate the drill bit 20, a drilling fluid pump 22 may pump drilling fluid, commonly referred to as "mud" or "drilling mud," downward through the center of the drill string 18 in the direction of the arrow 24 to the drill bit 20. At the drill bit 20, the drilling fluid may then exit the drill string 18 through ports (not shown). The drilling fluid may then flow in the direction of the arrows 28 through an annulus 30 between the drill string 18 and the subsurface formation 12 toward the surface 16. In this manner, the drilling fluid may carry drill cuttings away from the bottom of a borehole 26. Once at the surface 16, the returned drilling fluid may be filtered and conveyed back to a mud pit 32 for reuse.

Additionally, as depicted, the lower end of the drill string 18 includes a bottom-hole assembly 34 that includes the drill bit 20 along with various downhole tools, such as a measurement-while-drilling (MWD) tool 36 and a logging-while-drilling (LWD) tool 38. Generally, the downhole tools (e.g., MWD tool 36 and LWD tool 38) may facilitate determining characteristics of the surrounding subsurface formation 12. Thus, in some embodiments, the LWD tool 38 may include a radiation generator 70, which outputs radiation into the surrounding subsurface formation 12, and one or more radiation detectors 42, which may measure radiation returned from the surrounding subsurface formation 12 and/or radiation output from the radiation generator 70.

In some embodiments, a control system 44 may control operation of the LWD tool 38. For example, the control system 44 may instruct the radiation generator 70 when to output radiation, instruct the radiation generator 70 when to cease outputting radiation, receive measurements from the radiation detectors 42, process the measurements to determine characteristics of the surrounding environment (e.g., subsurface formation 12), process the measurements to monitor operation of the radiation generator 70, and/or process the measurements to control operation of the radiation generator 70. In some embodiments, the control system 44 may be included in the LWD tool 38. In other embodiments, the control system 44 may be separate from the LWD tool 38, for example, in another downhole tool or at the surface 16. In other embodiments, a portion of the control system 44 may be included in the LWD tool 38 and another portion may be located separate from the LWD tool 38.

When at least a portion is separate from the LWD tool 38, information (e.g., measurements and/or determined characteristics) may be transmitted to and/or within the control system 44 and/or a surface control system 45 for further processing, for example, via mud pulse telemetry system (not shown) and/or a wireless communication system (not shown). Accordingly, in some embodiments, the LWD tool 38 and/or the downhole control system 44 and/or the surface control system 45 may include wireless transceivers 50 to facilitate communicating information. In other embodiments data transmission may be through mud pulse telemetry and/or through the use of wired drill pipe to communicate with the surface control system 45. The surface control system 45 may communicate with a remote system through wired or wireless communication.

To facilitate controlling operation, the control system 44 and/or the surface control system 45 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Figure 2:
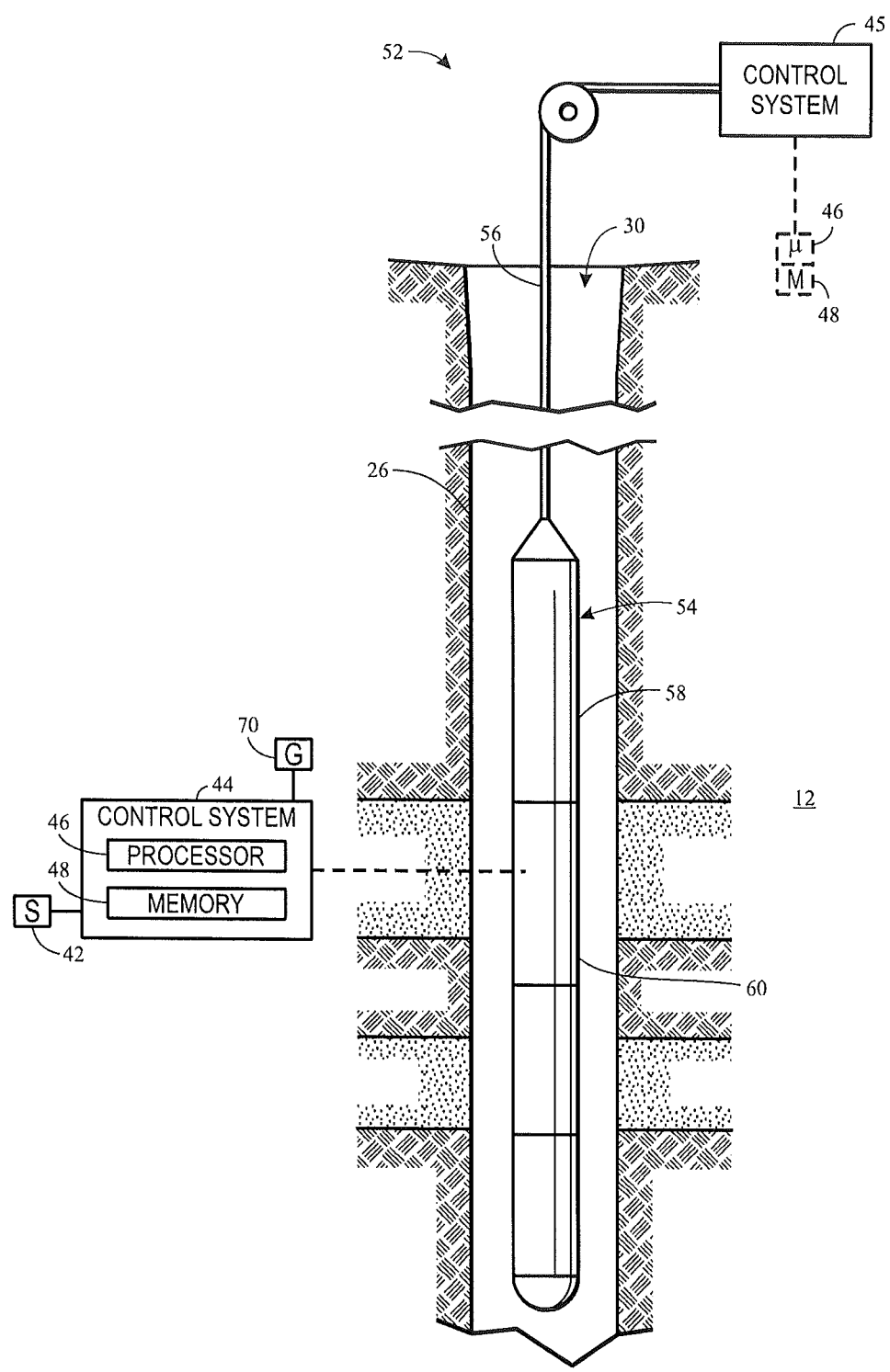
FIG. 2 is a schematic diagram of a wireline system including a downhole tool with the radiation generator, in accordance with an embodiment.

In addition to the LWD tool 38, a radiation generator 70 may be used in a wireline system 52, as shown in FIG. 2. In the depicted embodiment, the wireline system 52 includes a wireline assembly 54 suspended in the borehole 26 and coupled to at least a portion of the surface control system 45 via a cable 56. Similar to the bottom-hole assembly 34, the wireline assembly 54 may include various downhole tools. For example, in the depicted embodiment, the wireline assembly 54 includes a telemetry tool 58 and a tool 60 equipped with a radiation generator 70.

In some embodiments, the tool 60 may take measurements and communicate the measurements to the telemetry tool 58 to determine characteristics of the surrounding formation 12. Thus, in some embodiments, the tool 60 may include a radiation generator 70, which outputs radiation into the surrounding subsurface formation 12, and one or more radiation detectors 42, which may measure radiation returned from the surrounding subsurface formation 12 and/or radiation output from the radiation generator 70.

Similar to the LWD tool 38, a control system 44 may control operation of the tool 60. In some embodiments, the control system 44 may be included in the tool 60. In other embodiments, the control system 44 may be separate from the tool 60, for example, in another downhole tool or at the surface 16 in the surface control system 45. In other embodiments, a portion of the control system 44 may be included in the tool 60 and another portion may be located separate from the tool 60.

To facilitate controlling operation, the control system 44 and/or the surface control system 45 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Although described in relation to a drilling system 10 and a wireline system 52, radiation generators 70 may also be used in other implementations of downhole tools. For example, a radiation generator 70 may be used in a coiled tubing system, a wired drill pipe system, a slick line system, or the like. Although implementation may vary, operation of a radiation generator 70 may be generally similar in a downhole tool.

As described above, one or more radiation detectors 42 may measure characteristics of radiation output from the radiation generator 70 to facilitate determining characteristics of the surrounding subsurface formation 12 and/or the radiation generator 70. To facilitate determining characteristics of radiation output from the radiation generator 70, in some embodiments, one or more radiation detectors 42 may be included in a downhole tool proximate the radiation generator 70.

Figure 3:
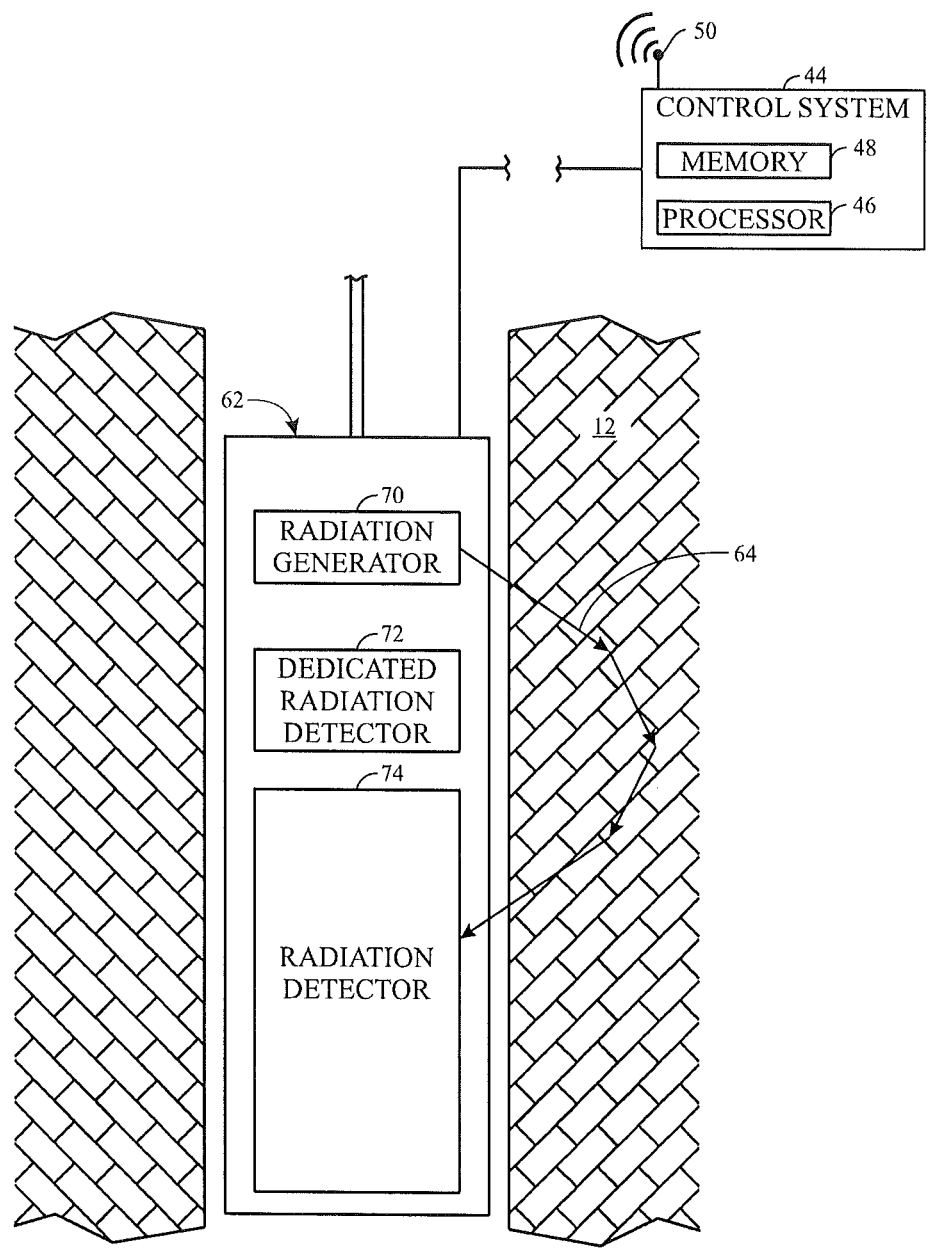
FIG. 3 is a block diagram the downhole tool of FIG. 2, in accordance with an embodiment.

To help illustrate, a more detailed view of a downhole tool 62 implemented in the wireline system 52 is shown in FIG. 3. The downhole tool 62 may be any type of downhole measuring tool that utilizes radiation to take measurements. For example, the downhole tool 62 may be a thermal neutron capture cross section measuring tool 35 capable of obtaining thermal neutron capture cross section measurements of the formation volume of interest. As depicted, the downhole tool 62 may include a radiation generator 70 that outputs radiation 64. In some embodiments, the radiation generator 70 may be an electronic X-ray generator, an electronic gamma ray generator, and/or an electronic neutron-generator such as a pulsed neutron generator or a neutron generator providing a continuous neutron output.

The radiation 64 generated by the radiation generator 70 may be emitted into the surrounding subsurface formation 12. In the subsurface formation 12, the radiation 64 may scatter or collide with atoms in the subsurface formation 12, thereby generating other radiation that may scatter. Some of the radiation 64 or radiation that results from interactions with the radiation 64 in the subsurface formation 12 may scatter and/or be reflected back to the downhole tool 62.

In some instances, the radiation returned to the downhole tool 62 may be indicative of properties of the surrounding subsurface formation 12. Thus, the downhole tool 62 may include a radiation detector 74 that determines sensor data based at least in part on interaction with received ionizing radiation. For example, the radiation detector 74 may determine sensor data such as a count rate of detected radiation, a spectrum of detected radiation, and/or cross section measurements, such as Sigma (macroscopic thermal neutron capture cross section of the formation) measurements based on the detected radiation.

Additionally, in some embodiments, the radiation detector 74 may communicate the sensor data to the surface control system 45, for example, as measurement signals via wired transmissions and/or wirelessly. As described above, in some embodiments, the control system 44 and/or the surface control system 45 may analyze and/or process sensor data to determine expected characteristics of the surrounding subsurface formation 12. For example, the control system 44 and/or the surface control system 45 may determine expected characteristics of the surrounding subsurface formation 12 based at least in part on relationship between characteristics of radiation returned from the subsurface formation 12 and characteristics of radiation output from the radiation generator 70.

Thus, in some embodiments, the downhole tool 62 may also include one or more dedicated radiation detectors 72 to facilitate determining characteristics of radiation output from the radiation generator 70. As depicted, the dedicated radiation detector 72 may be disposed in closer proximity to the radiation generator compared to the radiation detector 74 to facilitate determining characteristics of radiation 64 as it is being output from the radiation generator 70. Additionally, in some embodiments, radiation shielding may be disposed between the dedicated radiation detector 72 and the subsurface formation 12 to reduce likelihood of radiation returning from the subsurface formation 12 interacting with the dedicated radiation detector 72.

Similar to the radiation detector 74, the dedicated radiation detector 72 may determine sensor data based at least in part on interaction with received ionizing radiation. Additionally, in some embodiments, the dedicated radiation detector 72 may communicate the sensor data to the downhole control system 44 and/or the surface control system 45, for example, as measurement signals via wired transmissions and/or wirelessly. In this manner, the control system 44 and the surface control system 45 may analyze and/or process sensor data received from the dedicated radiation detector 72 to determine characteristics (e.g., intensity) of radiation 64. As discussed below, due to the specific type of detector used as the dedicated radiation detector 72, the control system 44 and/or the surface control system 45 may continue to receive accurate data from the dedicated radiation detector 72 even when the dedicated radiation detector 72 is exposed to high temperatures.

Figure 4:
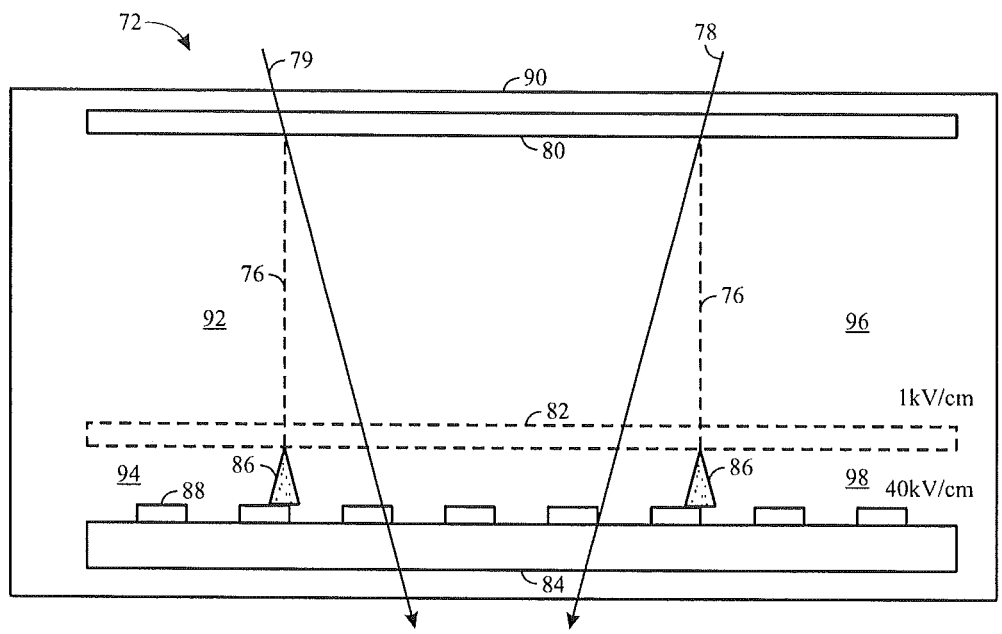
FIG. 4 is a block diagram of a micromesh gaseous detector used with the radiation generator, in accordance with an embodiment.

To help illustrate, one example of a radiation detector that may be used to implement a dedicated radiation detector 72 is shown in FIG. 4. In particular, the dedicated radiation detector 72 is a micromesh gaseous detector. Using a micromesh gaseous detector as the dedicated radiation detector 72 in downhole well-logging operations offers many benefits over other types of radiation detectors. For example, the dedicated radiation detector 72 may continue to provide accurate data even at the high temperatures (e.g., greater than 175 degrees Celsius), which are often present in a downhole setting. As described below, there are many more benefits to using a micromesh gaseous detector as the dedicated radiation detector 72 in well-logging.

As illustrated, a particle enters a chamber 90 of the dedicated radiation detector 72 with a first trajectory 78. In some embodiments, the chamber 90 may be filled with a suitable gas or combination of gases, such as argon and/or xenon. When the particle passes through a first electrode 80 into a first gap 92 on the first trajectory 78, the particle ionizes the gas in the first gap 92, which results in free electrons. As a result of an electric field produced in the first gap 92, the free electrons may move along a path 76 towards a micromesh 82, which functions as a positively charged second electrode with miniscule perforations through which electrons may pass.

The electrons may pass through the micromesh 82 into a second gap 94, which includes a second electric field 98 that is much stronger (e.g., forty times stronger) than the first electric field 96. As such, the free electrons are forced from the first gap 92 through the micromesh 82 into the second gap 94. After passing through the micromesh 82, the electrons are amplified via the second electric field 98 using an avalanche process. The avalanche process is a process in which the electrons that pass through the micromesh 82 may collide with atoms of the gas or gases present in the second gap 94. These collisions may cause electrons from the atoms of the gas or gases to be released, and the released electrons may then collide with more atoms of the gas or gases, causing even more electrons to be released. The process may continue until the electrons collide with a third electrode 84. For example, as depicted the electrons with the first trajectory 78 and/or moving along the path 76 pass through the micromesh 82 resulting in electrons 86 that are a product of the avalanche process.

The electrons 86 from the avalanche process may then contact the third electrode 84. The third electrode 84 may include one or more strips 88 each of which is electrically conductive. Thus, when the electrons 86 contacts a strip 88, an electrical signal (e.g., sensor data or measurement signal) may be amplified and communicated to the control system 44, for example, to facilitate determining intensity, energy, and/or rate of the radiation 64 emitted by the radiation generator 70.

In fact, in some embodiments, using multiple strips 88 may facilitate determining spatial characteristics, such as distribution of radiation 64, the first trajectory 78, a second trajectory 79 and/or the like, based at least in part on which strips 88 output current and/or magnitude of the output current. Thus, in some embodiments, each strip 88 may communicate a separate measurement signal to the control system 44. In other embodiments, any current output from the strips 88 may be combined into a single measurement signal communicated to the control system 44.

Figure 5:
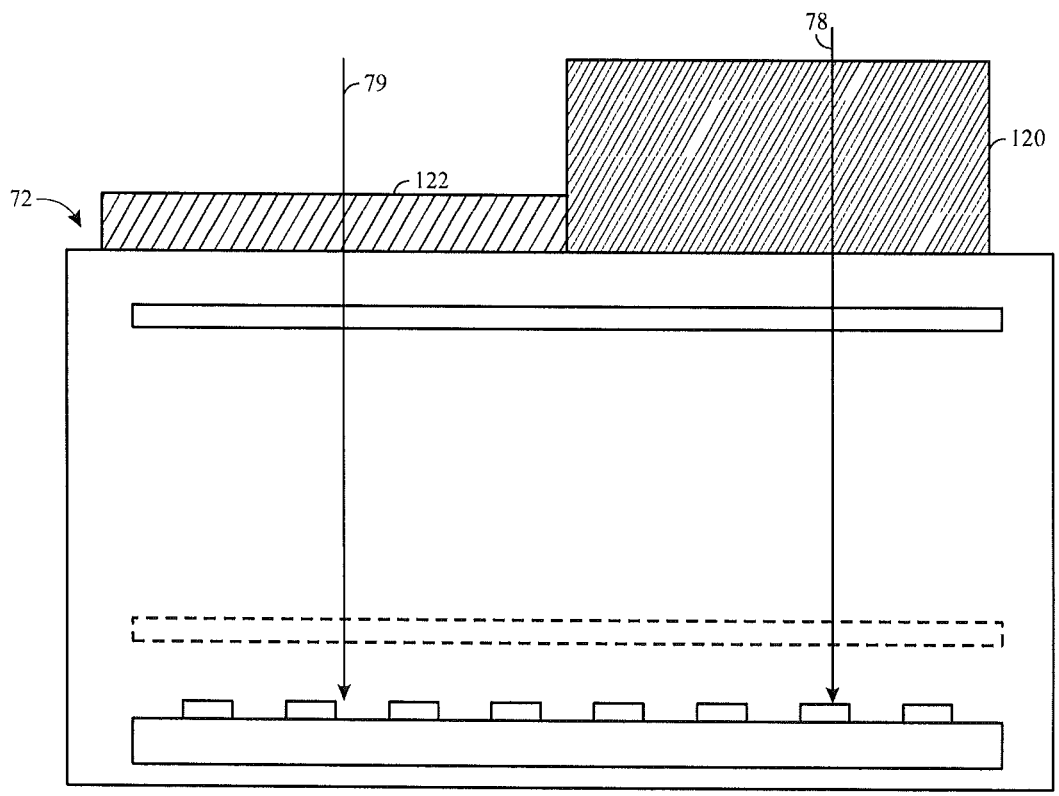
FIG. 5 is a schematic diagram of the micromesh gaseous detector of FIG. 4 equipped with different radiation-attenuating materials, in accordance with an embodiment.

In the present application the position sensitivity of the dedicated radiation detector 72 may be used to differentiate radiation characteristics. As shown in FIG. 5, radiation absorbing materials 120 and 122 with different compositions and thicknesses may be placed in front of the dedicated radiation detector 72. Material 120 may be tungsten with a thickness of 5 mm, while material 122 may be iron with a thickness of 2 mm. If the impinging radiation is X-ray or gamma ray radiation, then lower energy radiation will be attenuated much more in material 120 than in material 122. This difference can be used to determine an energy characteristic of the radiation generator 70 (e.g. an X-ray generator). For a more detailed discussion of this subject, see U.S. Patent Application entitled "Downhole X-Ray Radiation Detector Systems and Methods," filed on Dec. 29, 2016, which is hereby incorporated by reference in its entirety for all purposes.

The readout of the signal 86 from the strips 88 may be done in at least two different ways. In a first approach, the strips 88 are connected to fast electronics, each pulse is counted, and the radiation characteristic is determined based at least in part on the count rate of pulses in the one or more strips 88 in the dedicated radiation detector 72. In some cases of very high counting rates, where it may not be possible to resolve the single events, it may be advantageous to measure an average current from one or more of the strips 88.

With the foregoing in mind, advantages of using the micromesh gaseous detector as the dedicated radiation detector 72 in well-logging will now be discussed. As mentioned above, the micromesh gaseous detector may provide accurate data even in high temperature environments. Thus, operation of the radiation generator 70 may be more accurately monitored. In this particular case, because the micromesh gaseous detector is able to provide accurate measurements at the high temperatures, using a micromesh gaseous detector as the dedicated radiation detector 72 may facilitate monitoring and/or controlling operation of the radiation generator 70 in a downhole environment. Moreover, as the temperature downhole increases, the micromesh gaseous detector may continue to accurately monitor the radiation generator 70 and the radiation 64. In other words, the accuracy of the data collected by the dedicated radiation detector 72 is maintained even as the temperature increases in the downhole environment of the subsurface formation 12.

Moreover, data regarding the radiation 64 may be collected at an increased rate. For example, data regarding pulses of the radiation 64 may be collected as quickly as once every 150 to 250 nanoseconds. Thus, as applied to the downhole setting and well-logging, operation of the radiation generator 70 may monitored and/or controlled with increased granularity, for example, enabling control actions to be taken earlier. For instance, increasing data collection rate may reduce time used to obtain data regarding the radiation generator 70. As such, adjustments to the operation of the radiation generator 70 and, thus, the output radiation 64 may be made more quickly.

Moreover, due to the increased rate at which data can be collected, the dedicated radiation detector 72 may accurately monitor the radiation 64 as it emanates from the radiation generator 70 even when the downhole tool 62 is exposed to high fluxes of radiation encountered in well-logging. For instance, the downhole tool 62 may be exposed to fluxes of X-rays, gamma rays, and neutrons up to one billion hertz per millimeter (1,000,000,000 Hz/mm). However, due to the ability of a micromesh gaseous detector to collect data every 150 to 250 nanoseconds, the dedicated radiation detector 72 is still able to accurately monitor the radiation 64 as it exits the radiation generator 70, as long as count rates on a single strip do not exceed approximately 1 MHz.

Additionally, in comparison to other types of detectors that have previously been used as the dedicated radiation detector 72, the size of the dedicated radiation detector 72 may be smaller when a micromesh gaseous detector is used, such as in the current embodiment. For example, size of a micromesh gaseous detector may generally be smaller than that of a scintillator radiation detector. Such a decrease may allow more space in the downhole tool 62 for other detectors or sensors and/or allow for the dedicated radiation detector 72 to be positioned in close proximity to the radiation generator 70 and/or use more than one dedicated radiation detector 72.

Furthermore, using a micromesh gaseous detector may result in the dedicated radiation detector 72 being less sensitive to shock due to its smaller mass. For instance, the mass of the dedicated radiation detector 72 may be less than the mass of scintillator radiation detector and/or other types of detectors. This lower mass makes the dedicated radiation detector 72 less susceptible to false positives, which may be induced by shock to a radiation detector. Moreover, because the dedicated radiation detector 72 is less susceptible to sending false readings from shock, the dedicated radiation detector 72 may be more accurate than other types of detectors.

With the foregoing in mind, it should be noted that the efficiency of the dedicated radiation detector 72 may be lower than that of scintillators or other types of detectors. As used herein, "efficiency" is intended to describe probability that radiation with a particular energy or wavelength interacts with a detector. For example, when the dedicated detector is filled with xenon at a pressure of 20 bar, has dimensions of 25 centimeters by 10 centimeters by 1.5 centimeters, is enclosed by an aluminum case that is 2 millimeters thick, placed 50 centimeters from a point-like radiation source, and bombarded with 5000 photons of radiation having an energy range of 1 keV to 2 MeV, a micromesh gaseous detector may have an efficiency of 2.5 to 3.5%. However, under the same conditions, a scintillator radiation detector that includes a 2.54 centimeter by 20.32 centimeter crystal of sodium iodide (NaI) may have an efficiency of 29 to 31%. However, the efficiency of the micromesh gaseous detector may be increased by making the dedicated radiation detector 72 thicker, by increasing the pressure of the gas or gases inside in the dedicated radiation detector 72 and/or by using a high Z material or coating on the first electrode 80, such as platinum or gold if the dedicated radiation detector 72 is used to detect X-rays or gamma rays. It should be noted that, when used as a dedicated radiation detector 72, the micromesh gaseous detector is likely to have smaller dimensions than mentioned above to be placed closely to the radiation generator 70.

If the dedicated radiation detector 72 is to be used as a detector of fast neutrons, then a hydrogenous gas may be used at least in part to fill the dedicated radiation detector 72. The neutron scattering on the hydrogenous gas may create recoiling protons, which may ionize the hydrogenous gas. In another embodiment, the first electrode 80 may have a thin layer containing hydrogen (e.g., in the form of titanium hydride).

Figure 6:
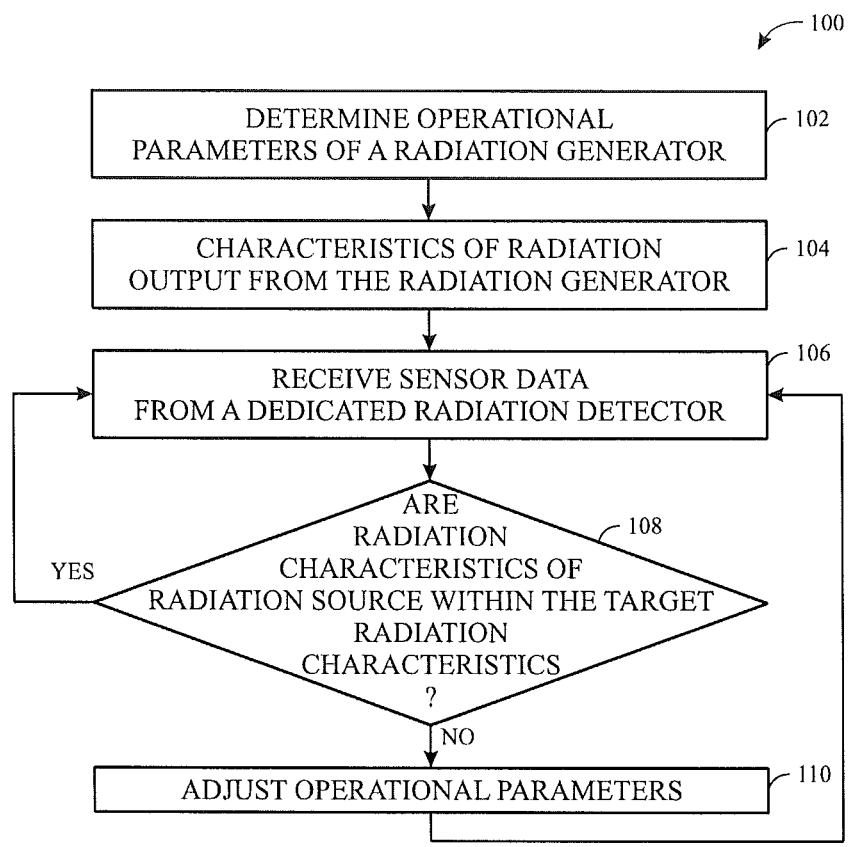
FIG. 6 is a flow diagram of a process for controlling operation of the radiation generator based at least in part on micromesh gaseous detector of FIG. 4, in accordance with an embodiment.

One embodiment of a process 100 for controlling operation of a radiation generator 70 based at least in part on sensor data received from a dedicated radiation detector 72 is described in FIG. 6. Generally, the process 100 includes determining operational parameters of a radiation generator (process block 102), determining target radiation characteristics of radiation output from the radiation generator (process block 104), receiving sensor data from a dedicated radiation sensor (process block 106), determining whether radiation characteristics of the radiation are within the target radiation characteristics (decision block 108), and adjusting operational parameters of the radiation generator when the radiation characteristics are not within the target radiation characteristics (process block 110). In some embodiments, the process 100 may be implemented by executing instructions stored in one or more tangible, non-transitory, computer-readable media, such as memory 48, using processing circuitry, such as processor 46.

Accordingly, in some embodiments, the control system 44 and/or the surface control system 45 may determine operational parameters of the radiation generator 70 (process block 102). In some embodiments, the control system 44 and/or the surface control system 45 may receive sensor data indicative of the operational parameters from one or more sensors. For example, the control system 44 and/or the surface control system 45 may receive sensor data indicative of voltage across a cathode and an anode of the radiation generator 70, temperature within the radiation generator 70, and/or pressure within the radiation generator 70. Additionally or alternatively, the control system 44 and/or the surface control system 45 may determine the operational parameters used to operate the radiation generator 70 based at least in part on user inputs.

Additionally, the control system 44 and/or the surface control system 45 may determine target characteristics of radiation to be output from the radiation generator 70 (process block 104). In some embodiments, the target characteristics may include target intensity of the radiation 64, target spectrum of the radiation 64, and/or target output rate of the radiation. Additionally, in some embodiments, the target radiation characteristics may be set based at least in part on user inputs, for example, to the control system 44.

Furthermore, in some embodiments, the target radiation characteristics may be set to facilitate improving determining characteristics of the subsurface formation 12. For example, the user input may suggest an amount or quality of data desired, and the control system 44 may determine target radiation settings that will satisfy the user input. Additionally, it should be noted that the target radiation settings may include specific values or ranges of values. For example, a target radiation setting related to the rate at which the radiation 64 is emitted from the radiation generator 70 could give a specific rate (e.g., 100 hertz) or a range of rates (e.g., 100 to 200 hertz).

The control system 44 and/or the surface control system 45 may also determine measured characteristics of the radiation 64 output from the radiation generator 70 based at least in part on sensor data received from the dedicated radiation detector 72 (process block 106). As described above, in some embodiments, the dedicated radiation detector 72 may communicate the sensor data to the control system 44 and/or the surface control system 45 via measurement signals, for example, that indicate interaction between the radiation 64 and the dedicated radiation detector 72. More specifically, the sensor data received from the dedicated radiation detector 72 may be targeted to radiation 64 received directly from the radiation generator 70. In other words, the sensor data received from the dedicated radiation detector 72 may be indicative of characteristics the radiation 64 as it exits the radiation generator 70. Among other things, the sensor data may be indicative of the energy of the radiation 64, the intensity of the radiation 64, and/or the rate at which the radiation 64 is being emitted from the radiation generator 70.

In this manner, the control system 44 may monitor operation of the radiation generator 70 based at least in part on the target characteristics and the measured characteristics of radiation 64 output from the radiation generator 70 (decision block 108). To facilitate monitoring operation, in some embodiments, the control system 44 and/or the surface control system 45 may determine whether a measured characteristic matches a corresponding target characteristic and/or is within a threshold of the corresponding target characteristics. For example, the threshold may reflect a maximum permitted deviation from a target intensity and/or energy of the radiation 64. As such, the control system 44 may determine whether a measured intensity and/or energy of the radiation 64 differs from the corresponding target characteristics by more than a corresponding threshold. In addition to the thresholds related to the power of the radiation 64, in some embodiments, there may also be thresholds related to the output rate of the radiation 64 and/or intensity of the radiation 64.

Additionally, in some embodiments, each of the thresholds may be set based at least in part on uncertainty in the measured characteristics. Furthermore, in some embodiments, the thresholds may be received as user inputs and/or determined based at least in part on the user inputs. Additionally or alternatively, in some embodiments, the thresholds may be predetermined and stored, for example, in memory 48. Moreover, in some embodiments, the thresholds may indicate a deviation value and/or a deviation percentage between the measured characteristic and the corresponding target characteristic.

In this manner, the control system 44 and/or the surface control system 45 may monitor operation of the radiation generator 70 by comparing each of the measured characteristics with corresponding target characteristics. For example, when each of the measured characteristics matches or is within a threshold of a corresponding target characteristic, the control system 44 may determine that the radiation generator 70 is operating as desired and, thus, continue operating using current operational parameters. Nevertheless, the control system 44 may continue monitoring operation of the radiation generator 70 based at least in part on sensor data received from the dedicated radiation detector 72.

On the other hand, when one or more of the measured characteristics do not match or are not within a threshold of a corresponding target characteristics, the control system 44 may determine that the radiation generator 70 is not operating as desired and, thus, adjust operational parameters used to operate the radiation generator 70 (process block 110). In some embodiments, the control system 44 may adjust the operational parameters by instructing a power supply (e.g., source) to adjust electrical power supplied to operate the radiation generator 70, for example, to adjust voltage across a cathode and an anode of the radiation generator 70. Additionally or alternatively, the control system 44 may adjust the operational parameters by instructing the radiation generator 70 to adjust internal pressure (in the case of a neutron generator). For example, if the radiation 64 is emitted at a rate that exceeds the threshold indicative of a maximum allowed rate of emittance, the control system 44 may send a control command (e.g., signal) to the radiation generator 70 instructing the radiation generator to reduce the output rate of the radiation 64.

Although described as being performed by the control system 44, it should be noted that the process 100 may be performed by other processors disposed on other devices such as the surface control system 45 that may be capable of communicating with the downhole control system 44, and/or the downhole tool 62, such as a computing device or other component associated with the drilling system 10. Additionally, although the process 100 describes a number of operations (e.g., steps) that may be performed, it should be noted that the operations may be performed in a variety of suitable orders and some of the operations may not be performed. Furthermore, it should be appreciated that the process 100 may be wholly executed by the control system 44 or the execution may be distributed between another computing device (e.g., downhole tool 62) and the control system 44.

Accordingly, techniques of the present disclosure provide technical advantages that include improving monitoring and/or controlling operation of a radiation generator in a downhole tool. In some embodiments, a dedicated radiation detector may be coupled proximate (e.g., adjacent) the radiation generator to facilitate determining characteristics of radiation output from the radiation generator. However, a downhole tool generally presents unique design considerations, such as limited available space and/or high environmental temperature, which potentially affect operation and/or accuracy of some types of radiation detectors. Accordingly, in some embodiments, the dedicated radiation detector implemented using one or more micromesh gaseous detectors. Generally, compared to other types of radiation detectors, a micromesh gaseous detector may be smaller and less likely effected by extreme operating conditions (e.g., high temperature). As such, implementing the dedicated radiation detector using one or more micromesh gaseous detectors may be particularly advantageous in the downhole tool.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

The invention claimed is:

1. A downhole tool, comprising:
a radiation generator configured to output radiation using electrical power received from a power supply, wherein a first portion of the radiation is emitted from the downhole tool into a surrounding subsurface formation and a second portion of the radiation is emitted from the radiation generator to a first radiation detector;
the first radiation detector coupled proximate the radiation generator, wherein:
the first radiation detector is configured to output a first measurement signal based at least in part on interaction with the second portion of the radiation output by the radiation generator; and
the first radiation detector comprises a micromesh gaseous detector having:
a chamber configured to be filled with gas;
a first electrode formed on a first inner surface of the chamber;
a second electrode comprising a micromesh, wherein the first electrode and the second electrode are configured to produce a first electric field across a first gap that causes radiation in the second portion of the radiation to interact with a first atom of the gas in the first gap to produce a first one or more free electrons;
a third electrode formed on a second inner surface of the chamber opposite the first inner surface, wherein the second electrode and the third electrode are configured to produce a second electric field across a second gap that causes the first one or more free electrons to flow through the micromesh into the second gap and interact with a second atom of the gas in the second gap to produce a second one or more free electrons; and
a plurality of conductive strips formed between the second electrode and the third electrode, wherein each of the plurality of conductive strips is configured to output electrical current included in the first measurement signal when struck by one or more of the first free electrons, one or more of the second free electrons, or combinations thereof; and
a control system communicatively coupled to the radiation generator and the first radiation detector, wherein the control system is configured to:
determine measured characteristics of the radiation output from the radiation generator based at least in part on the first measurement signal; and
control operation of the radiation generator based at least in part on the measured characteristics.

2. The downhole tool of claim 1, wherein the second electric field is greater than the first electric field to implement an avalanche process that increases number of total free electrons in the chamber, wherein the total free electrons include at least a portion of the first free elections, at least a portion of the second free electrons, or combinations thereof.

3. The downhole tool of claim 1, wherein the first radiation detector is configured to generate the first measurement signal by amplifying the electrical current output from the plurality of conductive strips.

4. The downhole tool of claim 1, wherein:
the gas comprises argon, xenon, or both; and
each of the plurality of conductive strips is formed in parallel on the third electrode.

5. The downhole tool of claim 1, wherein:
the plurality of conductive strips comprise:
a first conductive strip that outputs a first electrical current used to generate the first measurement signal when struck by one or more of the first free electrons, one or more of the second free electrons, or combinations thereof; and
a second conductive strip that outputs a second electrical current used to generate a second measurement signal communicated to the control system when struck by one or more one or more of the first free electrons, one or more of the second free electrons, or combinations thereof; and the control system is configured to determine spatial characteristics of the radiation output from the radiation generator based at least in part on the first measurement signal and the second measurement signal.

6. The downhole tool of claim 1, comprising a second radiation detector disposed farther from the radiation generator than the first radiation detector, wherein:

the second radiation detector is configured to output a second measurement signal based at least in part on interaction between return radiation received from the subsurface formation and the second radiation detector; and the control system is configured to determine expected characteristics of the subsurface formation based at least in part on the first measurement signal and the second measurement signal.

7. The downhole tool of claim 1, wherein, to control operation of the radiation generator, the control system is configured to:

instruct the power supply to adjust voltage of the electrical power supplied to the radiation generator;
instruct the radiation generator to adjust internal temperature; instruct the radiation generator to adjust internal pressure; or any combination thereof.

8. The downhole tool of claim 1, wherein, to control operation of the radiation generator, the control system is configured to:

determine target characteristics of the radiation output from the radiation generator; and
adjust operation of the radiation generator based at least in part on the measured characteristics to facilitate achieving the target characteristics.

9. The downhole tool of claim 1, wherein the radiation generator comprises an X-ray generator, a neutron generator, a gamma-ray generator, or any combination thereof.

10. A method for operating a radiation generator in a downhole tool, comprising:

generating, using a radiation generator in the downhole tool, radiation based at least in part on electrical power received from a power source, wherein a first portion of the radiation is emitted from the downhole tool to a surrounding subsurface formation and a second portion of the radiation is emitted from the radiation generator to a first radiation detector, wherein:

the first radiation detector comprises a micromesh gaseous detector;
a first radiation absorbing material having a first thickness and a second radiation absorbing material different than the first radiation absorbing material having a second thickness different than the first thickness are disposed between the radiation generator and the first radiation detector; and
the second portion of the radiation passes through the first radiation absorbing material, the second radiation material, or both prior to entering the first radiation detector;

outputting, using the micromesh gaseous detector, a first measurement signal indicative of interaction between the micromesh gaseous detector and the second portion of the radiation generated by the radiation generator;

determining, using a control system, a measured characteristic of the radiation generated by the radiation generator based at least in part on the first measurement signal; and controlling, using the control system, operation of the radiation generator based at least in part on the measured characteristic of the radiation generated by the radiation generator.

11. The method of claim 10, wherein outputting the first measurement signal comprises:

generating a first electric field across a first gap in the micromesh gaseous detector that causes a particle in the second portion of the radiation to collide with a first gas atom in first gap to produce a first free electron;
generating a second electric field across a second gap in the micromesh gaseous detector that causes the first free electrons to flow through a micromesh and collide with a second gas atom in the second gap to produce a second free electron; and
generating electrical current used to produce the first measurement signal when one or more of the first free electrons, one or more of the second free electrons, or combinations thereof collide with an electrode in the micromesh gaseous detector.

12. The method of claim 10, wherein outputting the first measurement signal comprises generating the first measurement signal by amplifying electrical output from an electrode in the micromesh gaseous detector.

13. The method of claim 10, comprising determining, using the control system, target characteristics of the radiation generated by the radiation generator;

wherein controlling operation of the radiation generator comprises:
determining operational parameters of the radiation generator used to generate the radiation; and
adjusting the operational parameters when the measured characteristic differs from the target characteristics of the radiation generated by the radiation generator.

14. The method of claim 10, wherein controlling operation of the radiation generator comprises:

instructing the power source to adjust voltage of the electrical power supplied to the radiation generator;
instructing the radiation generator to adjust internal temperature;
instructing the radiation generator to adjust internal pressure; or
any combination thereof.

15. The method of claim 10, comprising:

outputting, using a second radiation detector, a second measurement signal indicative of interaction between return radiation received from the subsurface formation and the radiation detector; and
determining, using the control system, expected characteristics of the subsurface formation by calibrating the second measurement signal based at least in part on the first measurement signal.

16. The method of claim 10, wherein:

the first radiation absorbing material comprises tungsten; and
the second radiation absorbing material comprises iron.

17. A tangible, non-transitory, computer-readable medium configured to store instructions executable by one or more processors of a control system to control operation of a downhole tool, wherein the instructions comprise instructions to:

determine, using the one or more processors, operational parameters used by a radiation generator in the downhole tool to generate radiation;

determine, using the one or more processors, target characteristics of the radiation to be emitted from the downhole tool to a surrounding subsurface formation;

receive, using the one or more processors, first sensor data indicated by electrical current output from a micromesh gaseous detector based at least in part on interaction between the micromesh gaseous detector and at least a portion of the radiation output from the radiation generator, said portion of the radiation is emitted from the radiation generator to the micromesh gaseous detector, wherein the micromesh gaseous detector comprises:
a chamber filled with gas;
a first electrode formed on a first inner surface of the chamber;
a second electrode comprising a micromesh, wherein the first electrode and the second electrode produce a first electric field across a first gap that causes an electron in the radiation output from the radiation generator that enters the first radiation detector to interact with a first atom of the gas in the first gap to produce a first one or more free electrons;
a third electrode formed on a second inner surface of the chamber opposite the first electrode, wherein the second electrode and the third electrode produce a second electric field across a second gap that causes the first one or more free electrons to flow through the micromesh into the second gap and interact with a second atom of the gas in the second gap to produce a second one or more free electrons; and
a conductive strip formed on the third electrode that outputs electrical current when struck by one or more of the first free electrons, one or more of the second free electrons, or combinations thereof;

determine, using the one or more processors, measured characteristics of the radiation based at least in part on the first sensor data; and instruct, using the one or more processors, the downhole tool to adjust the operational parameters used to operate the radiation generator based at least in part on the measure characteristics and the target characteristics of the radiation generated by the radiation generator.

18. The computer-readable medium of claim 17, wherein the instructions to determine the measured characteristics of the radiation comprise instructions to:
determine magnitude of the electrical current received from the micromesh gaseous detector; and
determine the measured characteristics based at least in part on the magnitude of the electrical current received from the micromesh gaseous detector.

19. The computer-readable medium of claim 17, comprising instructions to:
receive, using the one or more processors, second sensor data from a radiation detector indicative of interaction between the radiation detector and return radiation received from the subsurface formation, wherein:
the micromesh gaseous detector is a first distance from the radiation generator; and
the radiation detector is a second distance from the radiation generator greater than the first distance; and
determine, using the one or more processors, characteristics of the subsurface formation based at least in part on the first sensor data and the second sensor data.

20. The computer-readable medium of claim 17, wherein:
the instructions to determine the target characteristics of the radiation comprise instructions to:
determine a target intensity of the radiation;
determine a target energy of the radiation; and
determine a target output rate of the radiation;
the instructions to determine the measured characteristics of the radiation comprise instructions to:
determine a measured intensity of the radiation based at least in part on the first sensor data;
determine a measured energy of the radiation based at least in part on the first sensor data; and
determine a measured output rate of the radiation based at least in part on the first sensor data;
the instructions to instruct the downhole tool to adjust the operational parameters of the radiation generator comprise instructions to instruct the downhole tool to adjust the operational parameters when at least one of:
the measured intensity differs from the target intensity by more than a first threshold;
the measured energy differs from the target energy by more than a second threshold; and
the measured output rate differs from the target output rate by more than a third threshold; and
the instructions to instruct the downhole tool to adjust the operational parameters of the radiation generator comprise instructions to:
instruct a power source to adjust voltage between a cathode and an anode of the radiation generator;
instruct the radiation generator to adjust internal temperature; instruct the radiation generator to adjust internal pressure; or
any combination thereof.

* * * * *